United States Patent
Loc et al.

(10) Patent No.: US 7,417,952 B1
(45) Date of Patent: Aug. 26, 2008

(54) ADAPTIVE WIRELESS NETWORK MULTIPLE ACCESS TECHNIQUES USING TRAFFIC FLOW

(75) Inventors: Peter Loc, Cupertino, CA (US); Hui Yao Lin, Fremont, CA (US); Foo Keong Tang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 791 days.

(21) Appl. No.: 10/902,299

(22) Filed: Jul. 29, 2004

(51) Int. Cl.
*G01R 31/08* (2006.01)

(52) U.S. Cl. .................. 370/235; 370/338; 370/328; 455/418; 455/550.1

(58) Field of Classification Search ............. 370/235, 370/338, 328; 455/418, 550.1
See application file for complete search history.

(56) References Cited

U.S. PATENT DOCUMENTS

| | | | | |
|---|---|---|---|---|
| 6,081,527 | A * | 6/2000 | Chappel et al. | 370/394 |
| 6,141,354 | A * | 10/2000 | Nakatsugawa | 370/465 |
| 6,724,777 | B1 * | 4/2004 | Yamazaki et al. | 370/473 |
| 6,813,245 | B1 * | 11/2004 | Furuno | 370/236 |
| 6,914,903 | B1 * | 7/2005 | Miyazaki et al. | 370/389 |
| 7,065,332 | B2 * | 6/2006 | Tomida et al. | 455/151.2 |
| 7,130,313 | B2 * | 10/2006 | Pekonen | 370/473 |
| 7,257,125 | B1 * | 8/2007 | Pannell | 370/445 |
| 2002/0115457 | A1 * | 8/2002 | Koscal | 455/466 |
| 2003/0022628 | A1 * | 1/2003 | Mamiya et al. | 455/67.1 |

OTHER PUBLICATIONS

"Draft 802.20 Permanent Document: System Requirements for IEEE 802.20 Mobile Broadband Wireless Access Systems—Version 14," Jul. 16, 2004, pp. 1-23, IEEE 802.20-PD-06/ V<14>, IEEE, United States.

"802.16 IEEE Standard for Local and Metropolitan Area Networks; Part 16: Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.

IEEE Standard 802.11 (1999 Edition; 542 pages); IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications.

IEEE Standard 802.11a (1999 Edition; Amdended 2000; 92 pages); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; High-Speed Physical Layer in the 5 GHz Band.

(Continued)

*Primary Examiner*—Danh C Le

(57) ABSTRACT

A method, apparatus, and computer-readable media for a wireless local-area network comprises a transmit circuit to transmit first data; a transmit counter to count an amount of the first data transmitted by the transmit circuit during a predetermined monitoring interval; a receive circuit to receive second data; a receive counter to count an amount of the second data received by the receive circuit during the predetermined monitoring interval; and an adaptive access control circuit to generate an access trigger signal at a time determined by the amount of the first data counted by the transmit counter during the predetermined monitoring interval and the amount of the second data counted by the receive counter during the predetermined monitoring interval; and wherein the transmit circuit transmits third data according to the access trigger signal.

118 Claims, 5 Drawing Sheets

OTHER PUBLICATIONS

IEEE Standard 802.11B, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: Higher-Speed Physical Layer Extension in the 2.4 GHz Band, 1999 Edition, pp. 1-89.

IEEE Standard P802.11G, Draft Supplement to Standard for Information technology—Telecommuncations and information exchange bewalen systems—Local and metropolitan area networks—Specific requirements, Part 11: Wireless LAN Medium Access Control (MAC) and Physical Layer (PHY) specifications: Further Higher Data Rate Extension in the 2.4 GHz Band, Apr. 2003, pp. 1-69.

\* cited by examiner

ADAPTIVE WIRELESS NETWORK MULTIPLE ACCESS TECHNIQUES USING TRAFFIC FLOW

BACKGROUND

The present invention relates generally to wireless data networks. More particularly, the present invention relates to adaptive multiple access techniques for wireless networks.

In typical wireless networks, the wireless network devices use a common frequency band, and so must employ mechanisms to share the band. The most common sharing scheme is specified by the IEEE 802.11 standard, and is referred to as Carrier Sense Multiple Access/Collision Avoidance (CSMA/CA). According to CSMA/CA, a wireless network device monitors the band to determine whether other devices are transmitting. If no such transmissions are sensed, the wireless network device applies a back-off scheme then begins its intended transmission.

On receiving the packet without error, the recipient sends an acknowledgement (ACK) packet. If the wireless network device receives the ACK packet without error, the wireless network device begins its next transmission by monitoring the band again to determine whether other devices are transmitting.

However, if the wireless network device does not receive an ACK packet, or receives an ACK packet with errors, for example due to a collision with another station attempting to transmit on the band at the same time, the wireless network device waits for a random back-off interval and then re-sends the packet. Subsequent collisions require substantially longer back-off intervals.

The main disadvantage of CSMA/CA is that the back-off interval becomes longer, especially as the number of wireless devices in the wireless network increases, causing more collisions and reducing the performance of the wireless network.

SUMMARY

In general, in one aspect, the invention features a method, apparatus, and computer-readable media for wireless local-area network. It comprises a transmit circuit to transmit first data; a transmit counter to count an amount of the first data transmitted by the transmit circuit during a predetermined monitoring interval; a receive circuit to receive second data; a receive counter to count an amount of the second data received by the receive circuit during the predetermined monitoring interval; and an adaptive access control circuit to generate an access trigger signal at a time determined by the amount of the first data counted by the transmit counter during the predetermined monitoring interval and the amount of the second data counted by the receive counter during the predetermined monitoring interval; and wherein the transmit circuit transmits third data according to the access trigger signal.

Particular implementations can include one or more of the following features. A media access controller comprises the apparatus. A wireless network device comprises the media access controller. The wireless network device is otherwise compliant with at least one standard selected from the group consisting of IEEE standards 802.11, 802.11a, 802.11b, 802.11g, 802.11n, 802.16, and 802.20. Implementations comprise a physical layer device to transmit the data. A wireless client comprises the wireless network device. A wireless access point comprises the wireless network device. Implementations comprise a transmit delay counter to store a transmit delay count representing the transmit delay interval; wherein the adaptive access control circuit computes the transmit delay count based on the amount of the first data counted by the transmit counter during the predetermined monitoring interval and the amount of the second data counted by the receive counter during the predetermined monitoring interval; and wherein the adaptive access control circuit generates the access trigger signal at a time determined by the transmit delay interval. The adaptive access control circuit decrements the transmit delay counter by J counts when the amount of the first data counted by the transmit counter during the predetermined monitoring interval exceeds the amount of the second data counted by the receive counter during the predetermined monitoring interval by a predetermined traffic differential threshold value. J=1. Each count of the transmit delay counter represents one microsecond. The adaptive access control circuit decrements the transmit delay counter by K counts when the amount of the second data counted by the receive counter during the predetermined monitoring interval exceeds the amount of the first data counted by the transmit counter during the predetermined monitoring interval by a predetermined traffic differential threshold value. K=2. The adaptive access control circuit increments the transmit delay counter by L counts when the amount of the first data counted by the receive counter during the predetermined monitoring interval differs from the amount of the second data counted by the transmit counter during the predetermined monitoring interval by less than a predetermined traffic differential threshold value. L=1. Implementations comprise a further transmit counter to count an amount of third data transmitted by the transmit circuit to a wireless network device during a predetermined monitoring interval; a further receive counter to count an amount of fourth data received by the receive circuit from the wireless network device during the predetermined monitoring interval; and wherein the adaptive access control circuit calculates a further transmit delay interval based on the amount of the third data counted by the further transmit counter during the predetermined monitoring interval and the amount of the fourth data counted by the further receive counter during the predetermined monitoring interval; and wherein the transmit circuit transmits a access control signal representing the further transmit delay interval to the wireless network device. A media access controller comprises the apparatus. A wireless network device comprises the media access controller. The wireless network device is otherwise compliant with at least one standard selected from the group consisting of IEEE standards 802.11, 802.11a, 802.11b, 802.11g, 802.11n, 802.16, and 802.20. Implementations comprise a physical layer device to transmit the access control signal. A wireless access point comprises the wireless network device. Implementations comprise a transmit delay counter to store a transmit delay count representing the further transmit delay interval; wherein the adaptive access control circuit computes the transmit delay count based on the amount of the third data counted by the further transmit counter during the predetermined monitoring interval and the amount of the fourth data counted by the further receive counter during the predetermined monitoring interval; and wherein the access control signal represents the transmit delay count. The adaptive access control circuit decrements the transmit delay counter by J counts when the amount of the fourth data counted by the further receive counter during the predetermined monitoring interval exceeds the amount of the third data counted by the further transmit counter during the predetermined monitoring interval by a predetermined traffic differential threshold value. J=1. Each count of the transmit delay counter represents one microsecond. The adaptive access control circuit decrements the transmit delay counter by K counts when the amount of the third data counted by the further transmit counter during the predetermined monitoring interval exceeds the amount of the fourth data counted by the further receive counter during the predetermined monitoring interval by a predetermined traffic differential threshold value. K=2. The adaptive access control circuit increments the transmit delay counter by L counts when the amount of the fourth data counted by the further receive counter during the predetermined monitoring interval differs from the amount of the third data counted by the further transmit counter during the predetermined monitoring interval by less than a predetermined traffic differential threshold value. L=1. Implementations comprise the access control signal of claim.

In general, in one aspect, the invention features a method, apparatus, and computer-readable media for a wireless network. It comprises a first wireless network device; and a second wireless network device; wherein the first wireless network device comprises a first transmit circuit to transmit first data to the second wireless network device, a transmit counter to count an amount of the first data transmitted by the transmit circuit to the second wireless network device during a predetermined monitoring interval, a first receive circuit to receive second data from the second wireless network device, a receive counter to count an amount of the second data received by the receive circuit from the second wireless network device during the predetermined monitoring interval, and an adaptive access control circuit to calculate a transmit delay interval based on the amount of the first data counted by the transmit counter during the predetermined monitoring interval and the amount of the second data counted by the receive counter during the predetermined monitoring interval, and wherein the transmit circuit transmits an access control signal representing the transmit delay interval to the second wireless network device; and wherein the second wireless network device comprises a second transmit circuit to transmit third data to the first wireless network device, a second receive circuit to receive fourth data and control signals from the first wireless network device, wherein the second receive circuit receives the access control signal from the first wireless network device, an access control circuit to generate an access trigger signal at a time determined by the transmit delay interval in the access control signal, wherein the second transmit circuit transmits the third data according to the access trigger signal.

Particular implementations can include one or more of the following features. The first wireless network device is a wireless access point. The wireless access point is otherwise compliant with at least one standard selected from the group consisting of IEEE standards 802.11, 802.11a, 802.11b, 802.11g, 802.11n, 802.16, and 802.20. The second wireless network device is a wireless client. The wireless client is otherwise compliant with at least one standard selected from the group consisting of IEEE standards 802.11, 802.11a, 802.11b, 802.11g, 802.11n, 802.16, and 802.20. The first wireless network device further comprises a transmit delay counter to store a transmit delay count representing the transmit delay interval; wherein the adaptive access control circuit computes the transmit delay count based on the amount of the first data counted by the transmit counter during the predetermined monitoring interval and the amount of the second data counted by the receive counter during the predetermined monitoring interval; and wherein the access control signal represents the transmit delay count. The adaptive access control circuit decrements the transmit delay counter by J counts when the amount of the second data counted by the receive counter during the predetermined monitoring interval exceeds the amount of the first data counted by the transmit counter during the predetermined monitoring interval by a predetermined traffic differential threshold value. J=1. Each count of the transmit delay counter represents one microsecond. The adaptive access control circuit decrements the transmit delay counter by K counts when the amount of the first data counted by the transmit counter during the predetermined monitoring interval exceeds the amount of the second data counted by the receive counter during the predetermined monitoring interval by a predetermined traffic differential threshold value. K=2. The adaptive access control circuit increments the transmit delay counter by L counts when the amount of the second data counted by the receive counter during the predetermined monitoring interval differs from the amount of the first data counted by the transmit counter during the predetermined monitoring interval by less than a predetermined traffic differential threshold value. L=1. Implementations comprise the access control signal of claim 1.

In general, in one aspect, the invention features a method; apparatus, and computer-readable media for a wireless local-area network apparatus. It comprises a transmit circuit to transmit first data to a wireless network device; a transmit counter to count an amount of the first data transmitted by the transmit circuit to the wireless network device during a predetermined monitoring interval; a receive circuit to receive second data from the wireless network device; a receive counter to count an amount of the second data received by the receive circuit from the wireless network device during the predetermined monitoring interval; and an adaptive access control circuit to calculate a transmit delay interval based on the amount of the first data counted by the transmit counter during the predetermined monitoring interval and the amount of the second data counted by the receive counter during the predetermined monitoring interval; and wherein the transmit circuit transmits an access control signal representing the transmit delay interval to the wireless network device.

Particular implementations can include one or more of the following features. A media access controller comprises the apparatus. A wireless network device comprises the media access controller. The wireless network device is otherwise compliant with at least one standard selected from the group consisting of IEEE standards 802.11, 802.11a, 802.11b, 802.11g, 802.11n, 802.16, and 802.20. The wireless network device further comprises a physical layer device to transmit the access control signal. A wireless access point comprises the wireless network device. Implementations comprise a transmit delay counter to store a transmit delay count representing the transmit delay interval; wherein the adaptive access control circuit computes the transmit delay count based on the amount of the first data counted by the transmit counter during the predetermined monitoring interval and the amount of the second data counted by the receive counter during the predetermined monitoring interval; and wherein the access control signal represents the transmit delay count. The adaptive access control circuit decrements the transmit delay counter by J counts when the amount of the second data counted by the receive counter during the predetermined monitoring interval exceeds the amount of the first data counted by the transmit counter during the predetermined monitoring interval by a predetermined traffic differential threshold value. J=1. Each count of the transmit delay counter represents one microsecond. The adaptive access control circuit decrements the transmit delay counter by K counts when the amount of the first data counted by the transmit counter during the predetermined monitoring interval exceeds the amount of the second data counted by the receive counter during the predetermined monitoring interval by a predetermined traffic differential threshold value. K=2. Each count of the transmit delay counter represents one microsecond. The adaptive access control circuit increments the transmit delay counter by L counts when the amount of the second data counted by the receive counter during the predetermined monitoring interval differs from the amount of the first data counted by the transmit counter during the predetermined monitoring interval by less than a predetermined traffic differential threshold value. L=1. Implementations comprise the access control signal.

In general, in one aspect, the invention features a method, apparatus, and computer-readable media for a wireless local-area network apparatus for a wireless network. It comprises a transmit circuit to transmit first data; a receive circuit to receive second data and control signals; wherein the receive circuit receives an access control signal, the access control signal representing a transmit delay interval; an access control circuit to generate an access trigger signal at a time determined by the transmit delay interval in the access control signal; and wherein the transmit circuit transmits according to the access trigger signal.

Particular implementations can include one or more of the following features. The transmit delay interval is based on an amount of the second data received during a predetermined monitoring interval and an amount of the first data transmitted during the predetermined monitoring interval. A media access controller comprises the apparatus. A wireless network device comprises the media access controller. The wireless network device is otherwise compliant with at least one standard selected from the group consisting of IEEE standards 802.11, 802.11a, 802.11b, 802.11g, 802.11n, 802.16, and 802.20. The wireless network device further comprises a physical layer device to transmit the access control signal to the wireless network. A wireless client comprises the wireless network device. Implementations comprise the access control signal.

The details of one or more implementations are set forth in the accompanying drawings and the description below. Other features will be apparent from the description and drawings, and from the claims.

Figure 1:
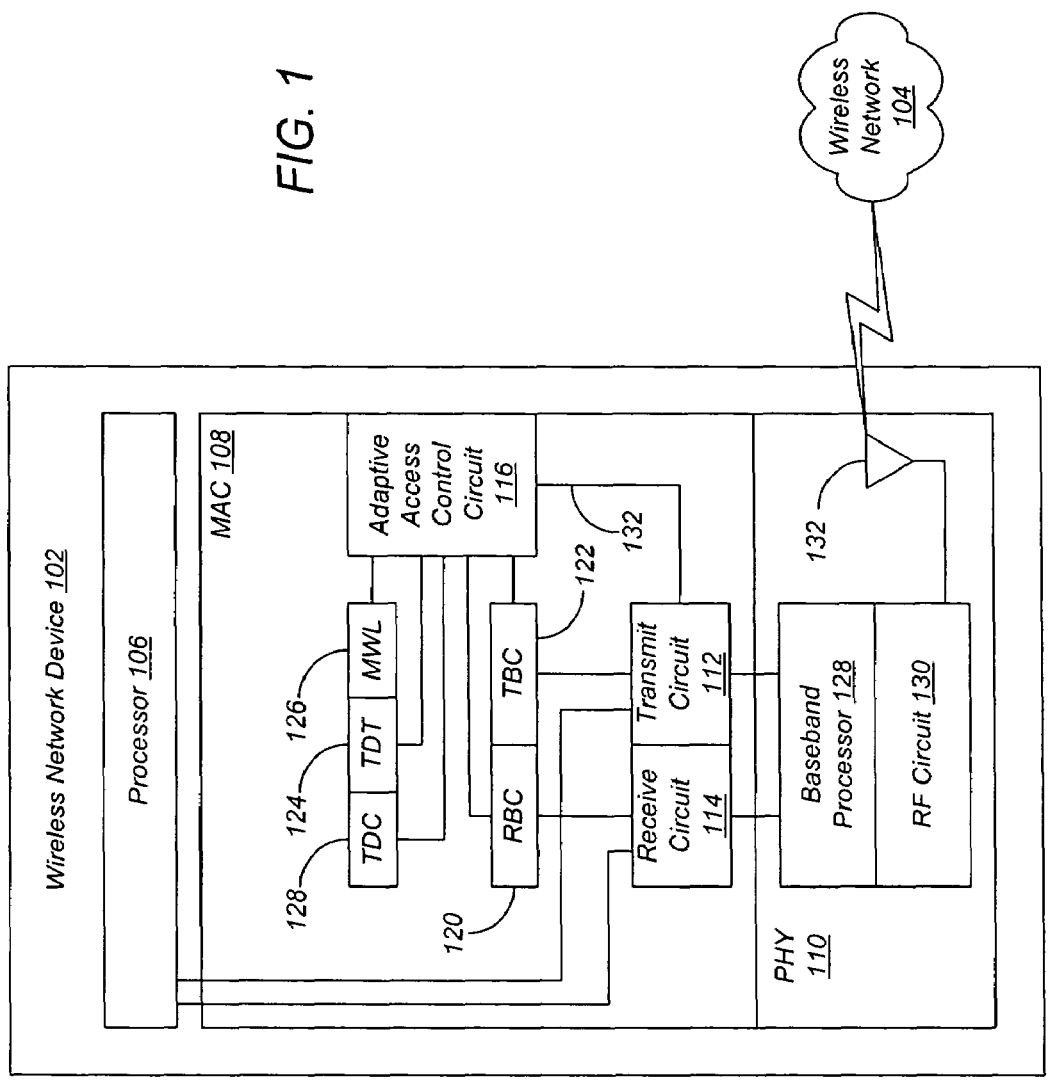
FIG. 1 shows a network device in communication with a wireless network according to a preferred embodiment.

The leading digit(s) of each reference numeral used in this specification indicates the number of the drawing in which the reference numeral first appears.

DETAILED DESCRIPTION

Embodiments of the present invention employ adaptive techniques to determine the timing of transmissions to a wireless network. In particular, the timing of transmissions by a wireless network device to a wireless network are determined according to the amount of data the wireless network device transmits and receives, as described in detail below.

FIG. 1 shows a network device 102 in communication with a wireless network 104 according to a preferred embodiment. Network device 102 can be a wireless client, a wireless access point, or any other wireless-enabled device such as a laptop computer, personal digital assistant, and the like, and is preferably otherwise compliant with one or more of IEEE standards 802.11, 802.11a, 802.11b, 802.11g, 802.11n, 802.16, and 802.20, which are incorporated by reference herein in their entirety. Network device 102 comprises a processor 106, a media access controller (MAC) 108, and a physical layer device (PHY) 110.

MAC 108 comprises a conventional transmit circuit 112 and a conventional receive circuit 114 for transmitting data to, and receiving data from, wireless network 104. MAC 108 also comprises an adaptive access control circuit 116, which can be implemented in hardware, software, or any combination thereof. MAC 108 further comprises a received byte counter (RBC) 120, a transmitted byte counter (TBC) 122, a register 124 for storing a traffic differential threshold (TDT), a register 126 for storing a monitoring window length (MWL), and a transmit delay counter (TDC) 128. PHY 110 comprises a conventional baseband processor 128, a conventional radio frequency (RF) circuit 130, and a conventional antenna 132.

In the described embodiments, the registers and counters in MAC 108 employ the following units, although of course other units can be used. Received byte counter 120 counts the number of bytes of data received during a monitoring window. Transmitted byte counter 122 counts the number of bytes of data transmitted during the monitoring window. Register 124 stores the traffic differential threshold in terms of a number of bytes of data. Register 126 stores the monitoring window length in units of seconds. Transmit delay counter 128 stores a transmit delay interval in units of microseconds.

Figure 2:
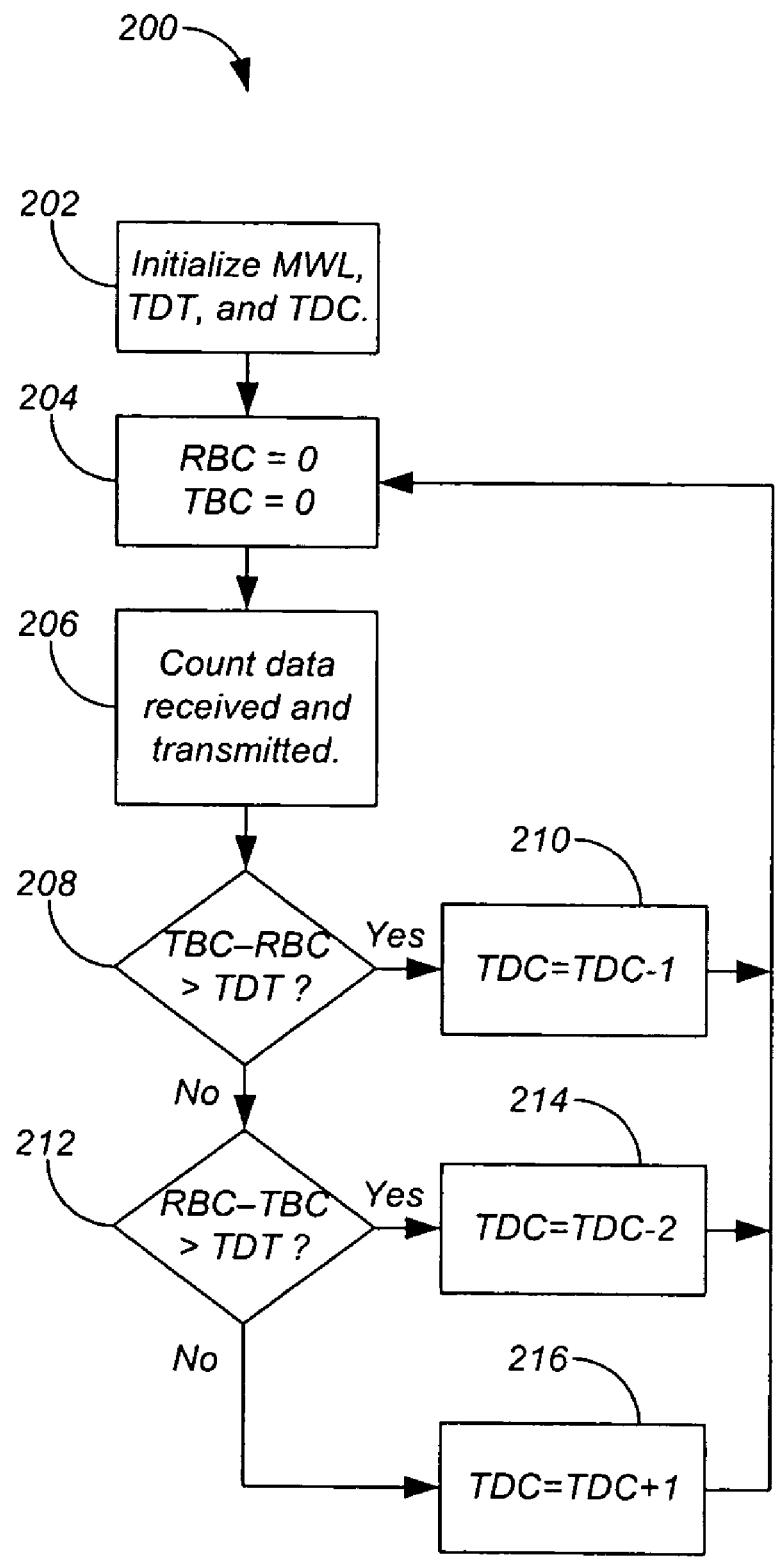
FIG. 2 shows a process for the wireless network device of FIG. 1 according to a preferred embodiment.

FIG. 2 shows a process 200 for wireless network device 102 according to a preferred embodiment. Adaptive access control circuit 116 initializes registers 124 and 126 and counter 128 to set initial values for MWL, TDT, and TDC, respectively (step 202). For example, MWL is set to 5 seconds, TDT is set to 64,000 bytes, and TDC is set to 190 microseconds. Adaptive access control circuit 116 initializes RBC and TBC to zero (step 204).

Counters 120 and 122 then count the amount of data received and transmitted, respectively, by wireless network device 102 over wireless network 104 during the monitoring interval specified by MWL (step 206). Adaptive access control circuit 116 then generates an access trigger signal 132 at a time determined by the counts RBC and TBC at the end of the monitoring interval. In particular, the values of RBC and TBC are used to set the value of TDC, which defines a transmit delay interval. Access trigger signal 132 is then asserted at the transmit delay interval, causing transmit circuit 112 to transmit.

Preferably the timing of access trigger signal 132 is determined in the following manner. In general, if TBC>RBC, meaning that network device 102 is transmitting more data than it is receiving, then the value of TDC is reduced, thereby causing network device 102 to transmit more frequently. And if TBC<RBC, meaning that network device 102 is transmitting less data than it is receiving, then the value of TDC is reduced more, which allows network device 102 to transmit more frequently.

In addition, the traffic differential threshold (TDT) is employed, as described in detail below. The use of TDT serves to reduce oscillations in the value of TDC, as well as providing a mechanism for increasing the value of TDC when appropriate. Thus at the end of each monitoring window, the following steps are taken.

If TBC−RBC>TDT (step 208), meaning that the amount of data transmitted during the monitoring window exceeds the amount of data received during the monitoring window by more than the traffic differential threshold, then TDC is decremented by J units, thereby reducing the transmit delay interval by J microseconds (step 210). Process 200 then resumes at step 204.

If RBC−TBC>TDT (step 212), meaning that the amount of data received during the monitoring window exceeds the amount of data transmitted during the monitoring window by more than the traffic differential threshold, then TDC is decremented by K units, thereby reducing the transmit delay interval by K microseconds (step 214). Process 200 then resumes at step 204.

If neither TBC−RBC>TDT nor RBC−TBC>TDT, meaning that the amount of data transmitted during the monitoring window differs from the amount of data received during the monitoring window by less than the traffic differential threshold, then TDC is incremented by L units, thereby increasing the transmit delay interval by L microseconds (step 216). Process 200 then resumes at step 204.

Preferably J<K. For example, J=1 and K=2. And in one example, L=1. Of course, other values can be used for J, K, and L.

In some embodiments, the transmit delay interval for a first wireless network device is adaptively set by a second wireless network device based on the amount of traffic exchanged by the two devices. For example, a wireless access point measures the amount of traffic exchanged with a client, computes a transmit delay interval for the client, and transmits a TDC value representing the transmit delay interval to the client. The client then uses the received TDC value to determine the timing of its access requests to the wireless network. One access point can provide such TDC values to multiple clients based on the amount of data exchanged with each client. One such embodiment is described below.

Figure 3:
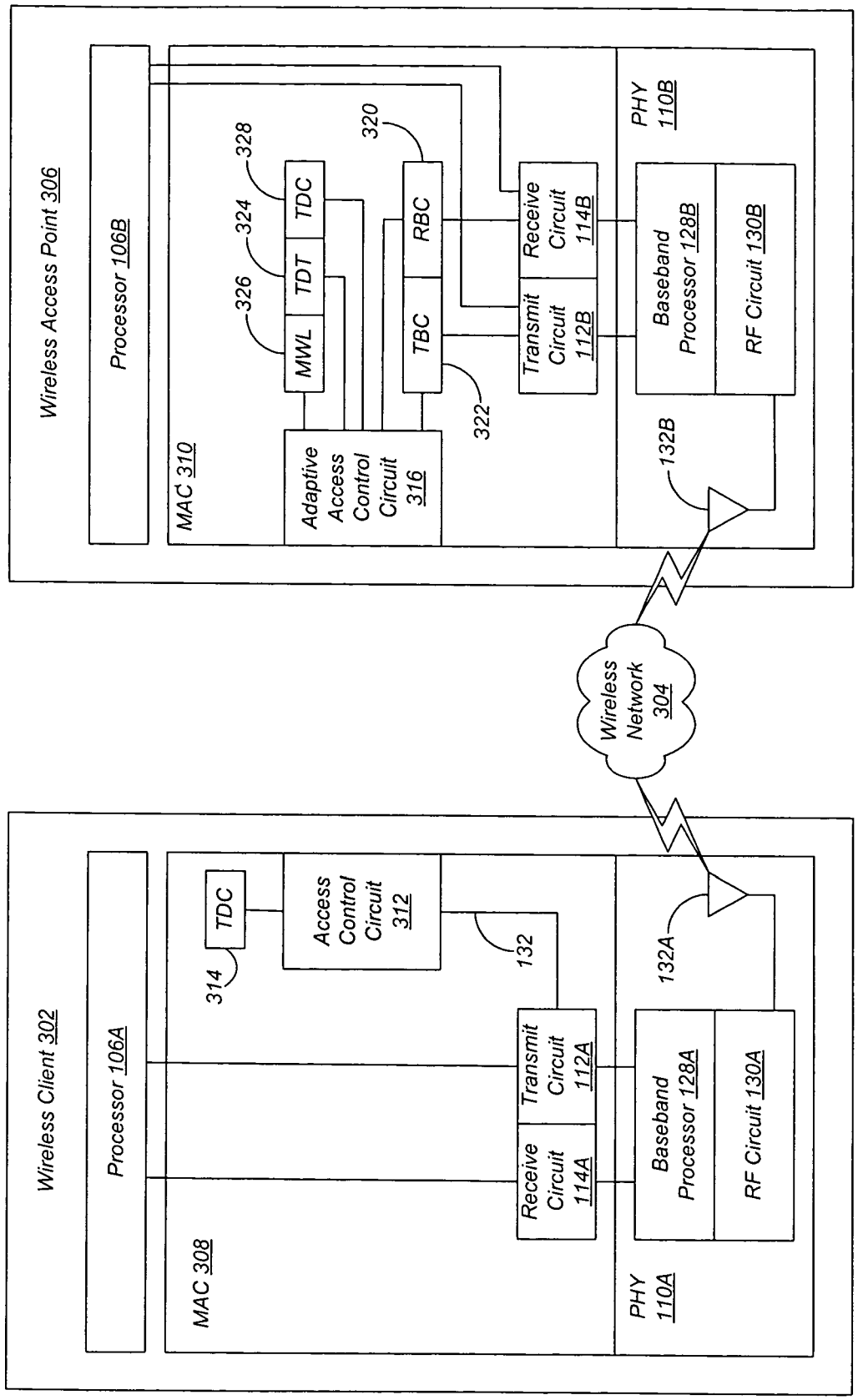
FIG. 3 shows a wireless client in communication with a wireless access point over a wireless network according to a preferred embodiment.

FIG. 3 shows a wireless client 302 in communication with a wireless access point 306 over a wireless network 304 according to a preferred embodiment. While devices 302 and 306 are discussed in terms of client and access point, embodiments of the present invention can be incorporated within other sorts of wireless network devices such as laptop computers, personal digital assistants, and the like. Wireless client 302 and wireless access point 306 are preferably otherwise compliant with one or more of IEEE standards 802.11, 802.11a, 802.11b, 802.11g, 802.11n, 802.16, and 802.20.

Wireless client 302 comprises a processor 106A, a media access controller (MAC) 308, and a physical layer device (PHY) 110A. MAC 308 comprises a conventional transmit circuit 112A and a conventional receive circuit 114A. MAC 308 also comprises an access control circuit 312, which can be implemented in hardware, software, or any combination thereof. MAC 308 further comprises a transmit delay counter (TDC) 314. PHY 110A comprises a conventional baseband processor 128A, a conventional radio frequency (RF) circuit 130A, and a conventional antenna 132A.

Wireless access point 306 comprises a processor 106B, a MAC 310, and a PHY 110B. MAC 310 comprises a conventional transmit circuit 112B and a conventional receive circuit 114B. MAC 310 also comprises an adaptive access control circuit 316, which can be implemented in hardware, software, or any combination thereof. MAC 310 further comprises a received byte counter (RBC) 320, a transmitted byte counter (TBC) 322, a register 324 for storing a traffic differential threshold (TDT), a register 326 for storing a monitoring window length (MWL), and a transmit delay counter (TDC) 328. PHY 110B comprises a conventional baseband processor 128B, a conventional RF circuit 130B, and a conventional antenna 132B.

In the described embodiments, the registers and counters in MAC 310 employ the following units, although of course other units can be used. Received byte counter 320 counts the number of bytes of data received from wireless client 302 during a monitoring window. Transmitted byte counter 322 counts the number of bytes of data transmitted to wireless client 302 during the monitoring window. Register 324 stores the traffic differential threshold in terms of a number of bytes of data. Register 326 stores the monitoring window length in units of seconds. Transmit delay counter 328 stores a transmit delay interval in units of microseconds.

While only one wireless client is shown in FIG. 3, it will be apparent to one skilled in the relevant arts after reading this description that wireless access point 306 can exercise adaptive access control over multiple clients. For example, wireless access point 306 can have TDC, RBC, and TBC counters for each client. Further, wireless access point 306 can use different values of MWL and TDT for each client if desired.

Figure 4:
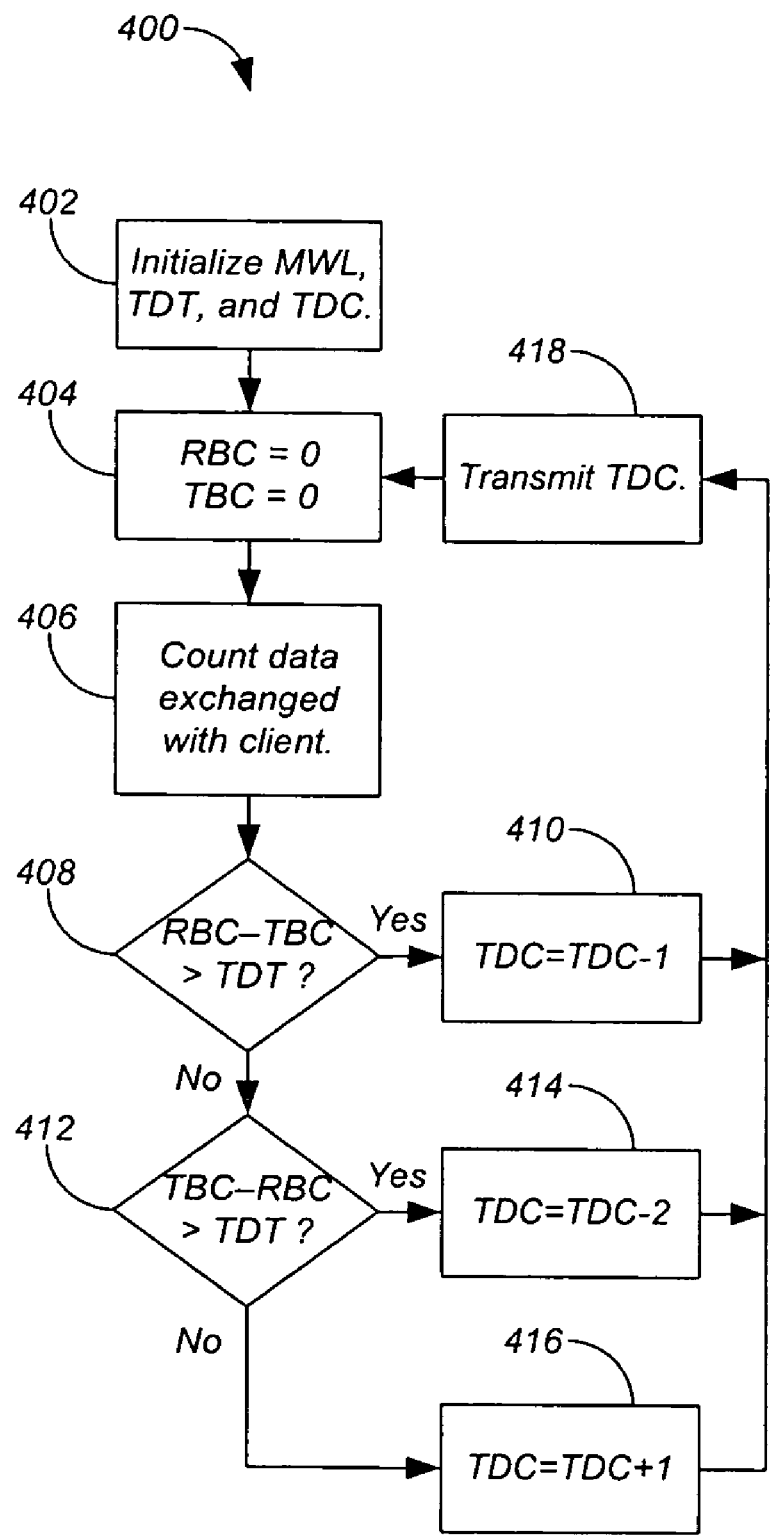
FIG. 4 shows a process for the wireless client and wireless access point of FIG. 3 according to a preferred embodiment.

FIG. 4 shows a process 400 for wireless client 302 and wireless access point 306 according to a preferred embodiment. Adaptive access control circuit 316 initializes registers 324 and 326 and counter 328 to set initial values for MWL, TDT, and TDC, respectively (step 402). For example, MWL is set to 5 seconds, TDT is set to 64,000 bytes, and TDC is set to 190 microseconds. Adaptive access control circuit 316 initializes RBC and TBC to zero (step 404).

Counters 320 and 322 then count the amount of data received and transmitted, respectively, by wireless access point 306 from wireless client 302 over wireless network 304 during the monitoring interval specified by MWL (step 406). Adaptive access control circuit 316 then determines a value for TDC, which defines a transmit delay interval for wireless client 302, based on the counts RBC and TBC at the end of the monitoring interval. Wireless access point 306 then transmits an access control signal comprising the value of TDC to wireless client 302, which asserts its access trigger signal 132 at the transmit delay interval defined by TDC, causing transmit circuit 112A to transmit.

Preferably the value of TDC is determined in the following manner. In general, if TBC<RBC, meaning that wireless client 302 is transmitting more data than it is receiving (note that the counters TBC and RBC are counting data at the far end of the link with the controlled device, rather than at the controlled device as in the previously-described embodiment), then the value of TDC is reduced, thereby causing wireless client 302 to transmit more frequently. And if TBC>RBC, meaning that wireless client 302 is transmitting less data than it is receiving, then the value of TDC is reduced more, which allows wireless client 302 to transmit more frequently.

In addition, the traffic differential threshold (TDT) is employed, as described in detail below. The use of TDT serves to reduce oscillations in the value of TDC, as well as providing a mechanism for increasing the value of TDC when appropriate. Thus at the end of each monitoring window, the following steps are taken.

If RBC−TBC>TDT (step 408), meaning that the amount of data transmitted by wireless client 302 during the monitoring window exceeds the amount of data received by wireless client 302 during the monitoring window by more than the traffic differential threshold, then TDC is decremented by J units, thereby reducing the transmit delay interval by J microseconds (step 410). Wireless access point 306 then transmits an access control signal comprising TDC to wireless client 302 (step 418). Process 400 then resumes at step 404.

If TBC−RBC>TDT (step 412), meaning that the amount of data received by wireless client 302 during the monitoring window exceeds the amount of data transmitted by wireless client 302 during the monitoring window by more than the traffic differential threshold, then TDC is decremented by K units, thereby reducing the transmit delay interval by K microseconds (step 414). Wireless access point 306 then transmits an access control signal comprising TDC to wireless client 302 (step 418). Process 400 then resumes at step 404.

If neither RBC−TBC>TDT nor TBC−RBC>TDT, meaning that the amount of data transmitted by wireless client 302 during the monitoring window differs from the amount of data received by wireless client 302 during the monitoring window by less than the traffic differential threshold, then TDC is incremented by L units, thereby increasing the transmit delay interval by L microseconds (step 416). Wireless access point 306 then transmits an access control signal comprising TDC to wireless client 302 (step 418). Process 400 then resumes at step 404.

Preferably J<K. For example, J=1 and K=2. And in one example, L=1. Of course, other values can be used for J, K, and L.

Figure 5:
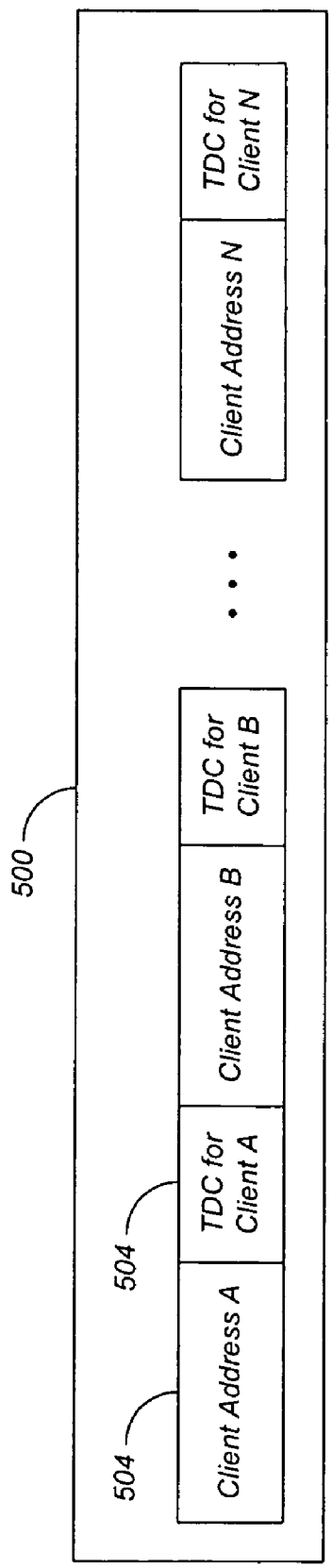
FIG. 5 shows a packet for an access control signal according to a preferred embodiment.

Preferably the access control signal comprises a packet having a predetermined format. FIG. 5 shows one such packet 500 according to a preferred embodiment. Packet 500 comprises $2^n$ fields, where n represents the number of clients. For each wireless client, packet 500 comprises an address field 502 and a TDC field 504. Address field 502 comprises the 8-byte MAC address of the wireless client. TDC field 504 comprises the TDC value computed for the client by the wireless access point.

Of course, other formats can be used. For example, instead of generating one packet with 2n fields, wireless access point can generate one packet for each client where each packet has the 2 fields 502 and 504.

In some embodiments, a device adaptively computes its own transmit delay interval as well as the transmit delay intervals for one for one or more other devices. For example, a wireless access point computes a transmit delay interval based on all the traffic sent and received by the wireless access point, for example as described above with respect to FIGS. 1 and 2. In addition, the wireless access point also measures the amount of traffic exchanged with each of its wireless clients, computes a transmit delay interval for each client based on the measurement for that client, and transmits a TDC value representing the respective transmit delay interval to each client, for example as described above with respect to FIGS. 3 and 4. Each client then uses the received TDC value to determine the timing of its transmissions to the wireless network.

Embodiments of the present invention can be used in ad hoc and infrastructure wireless networks, and can be used in conjunction with conventional back-off algorithms. Embodiments of the present invention can be used in some or all of the wireless network devices in a wireless network. Embodiments of the present invention increase network throughput substantially. In one wireless network comprising a wireless client and a wireless access point, an embodiment of the present invention raised the throughput of the network from 22 Mbps to 26 Mbps when implemented only in the wireless client, and to 31 Mbps when implemented in both the wireless client and the wireless access point.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless local-area network apparatus comprising:
   a transmit circuit to transmit first data;
   a transmit counter to count an amount of the first data transmitted by the transmit circuit during a predetermined monitoring interval;
   a receive circuit to receive second data;
   a receive counter to count an amount of the second data received by the receive circuit during the predetermined monitoring interval; and
   an adaptive access control circuit to generate an access trigger signal at a time determined by the amount of the first data counted by the transmit counter during the predetermined monitoring interval and the amount of the second data counted by the receive counter during the predetermined monitoring interval; and
   wherein the transmit circuit transmits third data according to the access trigger signal.

2. A media access controller comprising the apparatus of claim 1.

3. A wireless network device comprising the media access controller of claim 2.

4. A wireless network device according to claim 3 which is otherwise compliant with at least one standard selected from the group consisting of IEEE standards 802.11, 802.11a, 802.11b, 802.11g, 802.11n, 802.16, and 802.20.

5. The wireless network device of claim 3, further comprising:
   a physical layer device to transmit the data.

6. A wireless client comprising the wireless network device of claim 5.

7. A wireless access point comprising the wireless network device of claim 5.

8. The apparatus of claim 1, further comprising:
a transmit delay counter to store a transmit delay count representing the transmit delay interval;
wherein the adaptive access control circuit computes the transmit delay count based on the amount of the first data counted by the transmit counter during the predetermined monitoring interval and the amount of the second data counted by the receive counter during the predetermined monitoring interval; and
wherein the adaptive access control circuit generates the access trigger signal at a time determined by the transmit delay interval.

9. The apparatus of claim 8:
wherein the adaptive access control circuit decrements the transmit delay counter by J counts when the amount of the first data counted by the transmit counter during the predetermined monitoring interval exceeds the amount of the second data counted by the receive counter during the predetermined monitoring interval by a predetermined traffic differential threshold value.

10. The apparatus of claim 9:
wherein J=1.

11. The apparatus of claim 9:
wherein each count of the transmit delay counter represents one microsecond.

12. The apparatus of claim 8:
wherein the adaptive access control circuit decrements the transmit delay counter by K counts when the amount of the second data counted by the receive counter during the predetermined monitoring interval exceeds the amount of the first data counted by the transmit counter during the predetermined monitoring interval by a predetermined traffic differential threshold value.

13. The apparatus of claim 12:
wherein K=2.

14. The apparatus of claim 12:
wherein each count of the transmit delay counter represents one microsecond.

15. The apparatus of claim 8:
wherein the adaptive access control circuit increments the transmit delay counter by L counts when the amount of the first data counted by the receive counter during the predetermined monitoring interval differs from the amount of the second data counted by the transmit counter during the predetermined monitoring interval by less than a predetermined traffic differential threshold value.

16. The apparatus of claim 15:
wherein L=1.

17. The apparatus of claim 15:
wherein each count of the transmit delay counter represents one microsecond.

18. The apparatus of claim 1, further comprising:
a further transmit counter to count an amount of third data transmitted by the transmit circuit to a wireless network device during a predetermined monitoring interval;
a further receive counter to count an amount of fourth data received by the receive circuit from the wireless network device during the predetermined monitoring interval; and
wherein the adaptive access control circuit calculates a further transmit delay interval based on the amount of the third data counted by the further transmit counter during the predetermined monitoring interval and the amount of the fourth data counted by the further receive counter during the predetermined monitoring interval; and wherein the transmit circuit transmits a access control signal representing the further transmit delay interval to the wireless network device.

19. A media access controller comprising the apparatus of claim 18.

20. A wireless network device comprising the media access controller of claim 19.

21. A wireless network device according to claim 20 which is otherwise compliant with at least one standard selected from the group consisting of IEEE standards 802.11, 802.11a, 802.11b, 802.11g, 802.11n, 802.16, and 802.20.

22. The wireless network device of claim 20, further comprising:
a physical layer device to transmit the access control signal.

23. A wireless access point comprising the wireless network device of claim 22.

24. The apparatus of claim 18, further comprising:
a transmit delay counter to store a transmit delay count representing the further transmit delay interval;
wherein the adaptive access control circuit computes the transmit delay count based on the amount of the third data counted by the further transmit counter during the predetermined monitoring interval and the amount of the fourth data counted by the further receive counter during the predetermined monitoring interval; and
wherein the access control signal represents the transmit delay count.

25. The apparatus of claim 24:
wherein the adaptive access control circuit decrements the transmit delay counter by J counts when the amount of the fourth data counted by the further receive counter during the predetermined monitoring interval exceeds the amount of the third data counted by the further transmit counter during the predetermined monitoring interval by a predetermined traffic differential threshold value.

26. The apparatus of claim 25:
wherein J=1.

27. The apparatus of claim 25:
wherein each count of the transmit delay counter represents one microsecond.

28. The apparatus of claim 24:
wherein the adaptive access control circuit decrements the transmit delay counter by K counts when the amount of the third data counted by the further transmit counter during the predetermined monitoring interval exceeds the amount of the fourth data counted by the further receive counter during the predetermined monitoring interval by a predetermined traffic differential threshold value.

29. The apparatus of claim 28:
wherein K=2.

30. The apparatus of claim 28:
wherein each count of the transmit delay counter represents one microsecond.

31. The apparatus of claim 24:
wherein the adaptive access control circuit increments the transmit delay counter by L counts when the amount of the fourth data counted by the further receive counter during the predetermined monitoring interval differs from the amount of the third data counted by the further transmit counter during the predetermined monitoring interval by less than a predetermined traffic differential threshold value.

32. The apparatus of claim 31:
wherein L=1.

33. The apparatus of claim 31:
wherein each count of the transmit delay counter represents one microsecond.

34. The access control signal of claim 18.

35. A wireless local-area network apparatus comprising:
transmit means for transmitting first data;
transmit counter means for counting an amount of the first data transmitted by the transmit means during a predetermined monitoring interval;
receive means for receiving second data;
receive counter means for counting an amount of the second data received by the receive means during the predetermined monitoring interval; and
adaptive access control means for generating an access trigger signal at a time determined by the amount of the first data counted by the transmit counter means during the predetermined monitoring interval and the amount of the second data counted by the receive counter means during the predetermined monitoring interval; and
wherein the transmit means transmits third data according to the access trigger signal.

36. A media access controller comprising the apparatus of claim 35.

37. A wireless network device comprising the media access controller of claim 36.

38. A wireless network device according to claim 37 which is otherwise compliant with at least one standard selected from the group consisting of IEEE standards 802.11, 802.11a, 802.11b, 802.11g, 802.11n, 802.16, and 802.20.

39. The wireless network device of claim 37, further comprising:
physical layer means for transmitting the data.

40. A wireless client comprising the wireless network device of claim 39.

41. A wireless access point comprising the wireless network device of claim 39.

42. The apparatus of claim 35, further comprising:
transmit delay counter means for storing a transmit delay count representing the transmit delay interval;
wherein the adaptive access control means computes the transmit delay count based on the amount of the first data counted by the transmit counter means during the predetermined monitoring interval and the amount of the second data counted by the receive counter means during the predetermined monitoring interval; and
wherein the adaptive access control means generates the access trigger signal at a time determined by the transmit delay interval.

43. The apparatus of claim 42:
wherein the adaptive access control means decrements the transmit delay counter means by J counts when the amount of the first data counted by the transmit counter means during the predetermined monitoring interval exceeds the amount of the second data counted by the receive counter means during the predetermined monitoring interval by a predetermined traffic differential threshold value.

44. The apparatus of claim 43:
wherein J=1.

45. The apparatus of claim 43:
wherein each count of the transmit delay counter means represents one microsecond.

46. The apparatus of claim 42:
wherein the adaptive access control means decrements the transmit delay counter means by K counts when the amount of the second data counted by the receive counter means during the predetermined monitoring interval exceeds the amount of the first data counted by the transmit counter means during the predetermined monitoring interval by a predetermined traffic differential threshold value.

47. The apparatus of claim 46:
wherein K=2.

48. The apparatus of claim 46:
wherein each count of the transmit delay counter means represents one microsecond.

49. The apparatus of claim 42:
wherein the adaptive access control means increments the transmit delay counter means by L counts when the amount of the first data counted by the receive counter means during the predetermined monitoring interval differs from the amount of the second data counted by the transmit counter means during the predetermined monitoring interval by less than a predetermined traffic differential threshold value.

50. The apparatus of claim 49:
wherein L=1.

51. The apparatus of claim 49:
wherein each count of the transmit delay counter means represents one microsecond.

52. The apparatus of claim 35, further comprising:
further transmit counter means for counting an amount of third data transmitted by the transmit means to a wireless network device during a predetermined monitoring interval;
further receive counter means for counting an amount of fourth data received by the receive means from the wireless network device during the predetermined monitoring interval; and
wherein the adaptive access control means calculates a further transmit delay interval based on the amount of the third data counted by the further transmit counter means during the predetermined monitoring interval and the amount of the fourth data counted by the further receive counter means during the predetermined monitoring interval; and
wherein the transmit means transmits a access control signal representing the further transmit delay interval to the wireless network device.

53. A media access controller comprising the apparatus of claim 52.

54. A wireless network device comprising the media access controller of claim 53.

55. A wireless network device according to claim 54 which is otherwise compliant with at least one standard selected from the group consisting of IEEE standards 802.11, 802.11a, 802.11b, 802.11g, 802.11n, 802.16, and 802.20.

56. The wireless network device of claim 54, further comprising:
physical layer means for transmitting the access control signal.

57. A wireless access point comprising the wireless network device of claim 56.

58. The apparatus of claim 52, further comprising:
transmit delay counter means for storing a transmit delay count representing the further transmit delay interval;
wherein the adaptive access control means computes the transmit delay count based on the amount of the third data counted by the further transmit counter means during the predetermined monitoring interval and the amount of the fourth data counted by the further receive counter means during the predetermined monitoring interval; and wherein the access control signal represents the transmit delay count.

59. The apparatus of claim 58:
wherein the adaptive access control means decrements the transmit delay counter means by J counts when the amount of the fourth data counted by the further receive counter means during the predetermined monitoring interval exceeds the amount of the third data counted by the further transmit counter means during the predetermined monitoring interval by a predetermined traffic differential threshold value.

60. The apparatus of claim 59:
wherein J=1.

61. The apparatus of claim 59:
wherein each count of the transmit delay counter means represents one microsecond.

62. The apparatus of claim 58:
wherein the adaptive access control means decrements the transmit delay counter means by K counts when the amount of the third data counted by the further transmit counter means during the predetermined monitoring interval exceeds the amount of the fourth data counted by the further receive counter means during the predetermined monitoring interval by a predetermined traffic differential threshold value.

63. The apparatus of claim 62:
wherein K=2.

64. The apparatus of claim 62:
wherein each count of the transmit delay counter means represents one microsecond.

65. The apparatus of claim 58:
wherein the adaptive access control means increments the transmit delay counter means by L counts when the amount of the fourth data counted by the further receive counter means during the predetermined monitoring interval differs from the amount of the third data counted by the further transmit counter means during the predetermined monitoring interval by less than a predetermined traffic differential threshold value.

66. The apparatus of claim 65:
wherein L=1.

67. The apparatus of claim 65:
wherein each count of the transmit delay counter means represents one microsecond.

68. The access control signal of claim 52.

69. A method for a wireless network device comprising:
transmitting first data;
receiving second data;
counting an amount of the first data transmitted during a predetermined monitoring interval;
counting an amount of the second data received during the predetermined monitoring interval; and
transmitting third data at a time determined by the amount of the first data transmitted during the predetermined monitoring interval and the amount of the second data received during the predetermined monitoring interval.

70. The method of claim 69, wherein the wireless network device is otherwise compliant with at least one standard selected from the group consisting of IEEE standards 802.11, 802.11a, 802.11b, 802.11g, 802.11n, 802.16, and 802.20.

71. The method of claim 69, further comprising:
computing a transmit delay count based on the amount of the first data transmitted during the predetermined monitoring interval and the amount of the second data received during the predetermined monitoring interval; and
transmitting the third data at a time determined by the transmit delay count.

72. The method of claim 71, further comprising:
decrementing the transmit delay count by J counts when the amount of the first data transmitted during the predetermined monitoring interval exceeds the amount of the second data received during the predetermined monitoring interval by a predetermined traffic differential threshold value.

73. The method of claim 72:
wherein J=1.

74. The method of claim 72:
wherein each transmit delay count represents one microsecond.

75. The method of claim 71:
decrementing the transmit delay count by K counts when the amount of the second data received during the predetermined monitoring interval exceeds the amount of the first data transmitted during the predetermined monitoring interval by a predetermined traffic differential threshold value.

76. The method of claim 75:
wherein K=2.

77. The method of claim 75:
wherein each transmit delay count represents one microsecond.

78. The method of claim 71:
incrementing the transmit delay count by L counts when the amount of the second data received during the predetermined monitoring interval differs from the amount of the first data transmitted during the predetermined monitoring interval by less than a predetermined traffic differential threshold value.

79. The method of claim 78:
wherein L=1.

80. The method of claim 78:
wherein each transmit delay count represents one microsecond.

81. The method of claim 69, further comprising:
counting an amount of the third data transmitted to a further wireless network device during a predetermined monitoring interval;
counting an amount of the fourth data received from the further wireless network device during the predetermined monitoring interval;
calculating a further transmit delay interval based on the amount of the third data transmitted to the further wireless network device during the predetermined monitoring interval and the amount of the fourth data received from the further wireless network device during the predetermined monitoring interval; and
transmitting an access control signal representing the further transmit delay interval to the further wireless network device.

82. The method of claim 81, wherein the wireless network device is otherwise compliant with at least one standard selected from the group consisting of IEEE standards 802.11, 802.11a, 802.11b, 802.11g, 802.11n, 802.16, and 802.20.

83. The method of claim 81, further comprising:
computing a transmit delay count representing the further transmit delay interval based on the amount of the third data transmitted to the further wireless network device during the predetermined monitoring interval and the amount of the fourth data received from the further wireless network device during the predetermined monitoring interval;

wherein the access control signal represents the transmit delay count.

84. The method of claim 83:
decrementing the transmit delay count by J counts when the amount of the fourth data received from the further wireless network device during the predetermined monitoring interval exceeds the amount of the third data transmitted to the further wireless network device during the predetermined monitoring interval by a predetermined traffic differential threshold value.

85. The method of claim 84:
wherein J=1.

86. The method of claim 84:
wherein each transmit delay count represents one microsecond.

87. The method of claim 83:
decrementing the transmit delay count by K counts when the amount of the third data transmitted to the further wireless network device during the predetermined monitoring interval exceeds the amount of the fourth data received from the further wireless network device during the predetermined monitoring interval by a predetermined traffic differential threshold value.

88. The method of claim 87:
wherein K=2.

89. The method of claim 87:
wherein each transmit delay count represents one microsecond.

90. The method of claim 83:
incrementing the transmit delay count by L counts when the amount of the fourth data received from the further wireless network device during the predetermined monitoring interval differs from the amount of the third data transmitted to the further wireless network device during the predetermined monitoring interval by less than a predetermined traffic differential threshold value.

91. The method of claim 90:
wherein L=1.

92. The method of claim 90:
wherein each transmit delay count represents one microsecond.

93. The access control signal of claim 81.

94. A computer program embodying instructions executable by a computer for a wireless network device comprising:
counting an amount of first data transmitted by the wireless network device during a predetermined monitoring interval;
counting an amount of second data received by the wireless network device during the predetermined monitoring interval; and
causing the wireless network device to transmit third data at a time determined by the amount of the first data transmitted during the predetermined monitoring interval and the amount of the second data received during the predetermined monitoring interval.

95. The computer program of claim 94, wherein the wireless network device is otherwise compliant with at least one standard selected from the group consisting of IEEE standards 802.11, 802.11a, 802.11b, 802.11g, 802.11n, 802.16, and 802.20.

96. The computer program of claim 94, further comprising:
computing a transmit delay count based on the amount of the first data transmitted during the predetermined monitoring interval and the amount of the second data received during the predetermined monitoring interval; and
causing the wireless network device to transmit the third data at a time determined by the transmit delay count.

97. The computer program of claim 96, further comprising:
decrementing the transmit delay count by J counts when the amount of the first data transmitted during the predetermined monitoring interval exceeds the amount of the second data received during the predetermined monitoring interval by a predetermined traffic differential threshold value.

98. The computer program of claim 97:
wherein J=1.

99. The computer program of claim 97:
wherein each transmit delay count represents one microsecond.

100. The computer program of claim 96:
decrementing the transmit delay count by K counts when the amount of the second data received during the predetermined monitoring interval exceeds the amount of the first data transmitted during the predetermined monitoring interval by a predetermined traffic differential threshold value.

101. The computer program of claim 100:
wherein K=2.

102. The computer program of claim 100:
wherein each transmit delay count represents one microsecond.

103. The computer program of claim 96:
incrementing the transmit delay count by L counts when the amount of the second data received during the predetermined monitoring interval differs from the amount of the first data transmitted during the predetermined monitoring interval by less than a predetermined traffic differential threshold value.

104. The computer program of claim 103:
wherein L=1.

105. The computer program of claim 103:
wherein each transmit delay count represents one microsecond.

106. The computer program of claim 94, further comprising:
counting an amount of the third data transmitted to a further wireless network device during a predetermined monitoring interval;
counting an amount of the fourth data received from the further wireless network device during the predetermined monitoring interval;
calculating a further transmit delay interval based on the amount of the third data transmitted to the further wireless network device during the predetermined monitoring interval and the amount of the fourth data received from the further wireless network device during the predetermined monitoring interval; and
causing the wireless network device to transmit an access control signal representing the further transmit delay interval to the further wireless network device.

107. The computer program of claim 106, wherein the wireless network device is otherwise compliant with at least one standard selected from the group consisting of IEEE standards 802.11, 802.11a, 802.11b, 802.11g, 802.11n, 802.16, and 802.20.

108. The computer program of claim 106, further comprising:
computing a transmit delay count representing the further transmit delay interval based on the amount of the third data transmitted to the further wireless network device during the predetermined monitoring interval and the amount of the fourth data received from the further wireless network device during the predetermined monitoring interval;

wherein the access control signal represents the transmit delay count.

109. The computer program of claim 108:

decrementing the transmit delay count by J counts when the amount of the fourth data received from the further wireless network device during the predetermined monitoring interval exceeds the amount of the third data transmitted to the further wireless network device during the predetermined monitoring interval by a predetermined traffic differential threshold value.

110. The computer program of claim 109:

wherein J=1.

111. The computer program of claim 109:

wherein each transmit delay count represents one microsecond.

112. The computer program of claim 108:

decrementing the transmit delay count by K counts when the amount of the third data transmitted to the further wireless network device during the predetermined monitoring interval exceeds the amount of the fourth data received from the further wireless network device during the predetermined monitoring interval by a predetermined traffic differential threshold value.

113. The computer program of claim 112:

wherein K=2.

114. The computer program of claim 112:

wherein each transmit delay count represents one microsecond.

115. The computer program of claim 108:

incrementing the transmit delay count by L counts when the amount of the fourth data received from the further wireless network device during the predetermined monitoring interval differs from the amount of the third data transmitted to the further wireless network device during the predetermined monitoring interval by less than a predetermined traffic differential threshold value.

116. The computer program of claim 115:

wherein L=1.

117. The computer program of claim 115:

wherein each transmit delay count represents one microsecond.

118. The access control signal of claim 106.

* * * * *

UNITED STATES PATENT AND TRADEMARK OFFICE
CERTIFICATE OF CORRECTION

| | | |
|---|---|---|
| PATENT NO. | : 7,417,952 B1 | Page 1 of 1 |
| APPLICATION NO. | : 10/902299 | |
| DATED | : August 26, 2008 | |
| INVENTOR(S) | : Peter Loc et al. | |

It is certified that error appears in the above-identified patent and that said Letters Patent is hereby corrected as shown below:

Title Page, Column 2      Under references "Other Publications", delete "Amdended" and insert -- Amended -- (reference begins with "IEEE Standard 802.11a"

Column 4, Line 19      Delete "1" and insert -- 119 --

Column 9, Line 39      Delete second occurrence of "for one"

Signed and Sealed this

Twenty-first Day of October, 2008

JON W. DUDAS
*Director of the United States Patent and Trademark Office*